United States Patent [19]
Moffa et al.

[11] Patent Number: 6,106,066
[45] Date of Patent: Aug. 22, 2000

[54] STOWABLE CANTILEVERED SEAT

[75] Inventors: Michael Douglas Moffa, Glenview;
Erin Renée Reichenberger, Chicago;
Michael Minbiole, Evanston, all of Ill.

[73] Assignee: Freedman Seating Company, Ill.

[21] Appl. No.: 09/386,013

[22] Filed: Aug. 30, 1999

[51] Int. Cl.[7] ...................................................... A47C 1/02
[52] U.S. Cl. ........................ 297/332; 297/378.1; 297/326
[58] Field of Search ................................. 297/452.39, 14,
297/331, 334, 378.1, 335, 344.1, 314, 325,
326; 248/346.01, 240.01, 188.1, 188.6;
296/65.1

[56] References Cited

U.S. PATENT DOCUMENTS

| | | |
|---|---|---|
| 2,797,732 | 7/1957 | Thomas . |
| 5,489,141 | 2/1996 | Strausbaugh et al. . |
| 5,492,389 | 2/1996 | McClintock et al. . |
| 5,984,397 | 11/1999 | Dawson et al. . |

*Primary Examiner*—Milton Nelson, Jr.
*Attorney, Agent, or Firm*—Irwin C. Alter

[57] ABSTRACT

A stowable seat for mounting to a support member of a vehicle and for use next to a preexisting obstruction wherein a space may be selectively provided for positioning a wheelchair article adjacent to the stowed seat which includes a frame attached to the support member (floor), a cantilevered seatbase and a seatback. The cantilevered seatbase has a free end, a linked end associated along a path generated arc with the frame for providing the seatbase with a range of motion that avoids the obstruction even when moved from a horizontally deployed position to a substantially vertical stowed position. For additional stability a diagonal support truss supports the seatbase in the deployed position with a movable end of the support truss sliding within a runner track and a fixed end journalled with the frame working in combination with said linked end defining the vertical and lateral motion of the seatbase. The seatback is rotatably associated with the seatbase and has a range of motion extending from an unfolded position to a folded where the seatback in the unfolded position can be adapted to be at a predetermined angle with respect to the seatbase in said deployed position to provide seating and the seatback in the folded position can be adapted to fold flat against the seatbase for stowing to provide the space for the wheelchair.

15 Claims, 6 Drawing Sheets

STOWABLE CANTILEVERED SEAT

BACKGROUND OF INVENTION

This invention relates generally to an improved fold away seat for use in and clearing a preexisting obstruction in a vehicle such as a wheel well in order to provide a space for a wheelchair or for storage of various articles. The invention preferably includes a cantilevered seatbase which employs a path generating linkage system to lift and rotate it substantially about one end from a horizontally deployed position to a substantially vertical stowed position where a diagonal truss supports the seatbase when in the horizontally deployed position to a substantially vertical stowed position where a diagonal truss supports the seatbase when in the horizontally deployed position. The seatbase is provided with a seatback which has a lockable unfolded position as well as a lockable folded position flat against the seatbase. The fold away seat is stowed by folding the seatback substantially flat against the seatbase, unlocking the seatbase from its horizontally deployed position by actuating a releasable handle operatively connected to a releasable pin means thereby releasing the pin from a positioning hole in the seatbase. The seatbase is then rotated through a path generated arc by the path generating linkage system where the pin slides on the surface of riding plate means until the seatbase is put into its substantially vertical stowed position where the pin falls into a second positioning hole on the seatbase thereby releasably locking the seatbase. Extra aisle space is provided as the frame can be mounted on the floor right next to a preexisting obstruction because the path generating linkage system provides the seatbase with a path generated arc motion allowing clearance over a preexisting obstruction.

Previously, the seats known that were stowable and cantilevered were like the one disclosed in U.S. Pat. No. 5,492,389. This type of configuration eliminated an aisle leg fastened to the floor as shown in Strausbaugh et al. U.S. Pat. No. 5,489,141 issued on Feb. 6, 1996. However, clearing obstructions such as wheel wells created other problems when utilizing the McClintock and Moffa invention.

SUMMARY AND OBJECTS OF THE INVENTION

Accordingly, it is an object of the present invention to provide a stowable seat for mounting to a support member of a vehicle that can be deployed and then stowed above a preexisting obstruction such as a wheel well wherein a space may be selectively provided for positioning a wheelchair or article adjacent to the stowed seat which includes a frame or floormount, a seatbase and a seatback. Further, it is an object to provide a stowable seat which is readily mounted in place and avoids the use of protruding legs on the end thereof which may interfere with an obstruction or an operator.

Accordingly, the frame attaches to the support member (floor) and the cantilevered seatbase has a free end and a linked end associated along a path generated arc with the frame to provide the seatbase with a range of motion extending from a horizontally deployed position to a substantially vertical stowed position. For security, the seatbase employs a releasable locking mechanism means that can include riding plate means and releasable pin means with a pin or pins that slide on the surface of riding plate means and releasably lock the seatbase in the deployed and stowed positions. For stability, the seatbase also has a diagonal support truss supporting the seatbase in the deployed position which has a movable end sliding within a runner track and a fixed end journalled with the frame, as well as a lock mechanism near the free end to restrain the movable end of the truss to maintain the seatbase in the deployed position. Stabililty is also provided by a cap mechanism mounted to the seatbase at a predetermined location so that when the seatbase is lowered into its deployed position the cap mechanism impinges on the top of the frame preventing further downward movement of the seatbase with respect to the frame.

The seatback is rotatably associated with the seatbase and has a range of motion extending from an unfolded position to a folded position. The seatback in the folded position is adapted to be at a predetermined angle with respect to the seatbase in said deployed position to provide seating and the seatback in the folded position is adapted to fold flat against the seatbase for stowing to provide the space for the wheelchair as well as clear obstructions such as a wheel well and to eliminate location and other problems caused by having a seat that is not stowed by employing a path generating linkage system.

BRIEF DESCRIPTION OF THE DRAWINGS

In order to satisfy the objects of the invention discussed herein, a stowable seat for mounting to a support member of a vehicle is provided as illustrated by the accompanying drawings wherein.

DESCRIPTION OF THE PREFERRED EMBODIMENT

Figure 1:
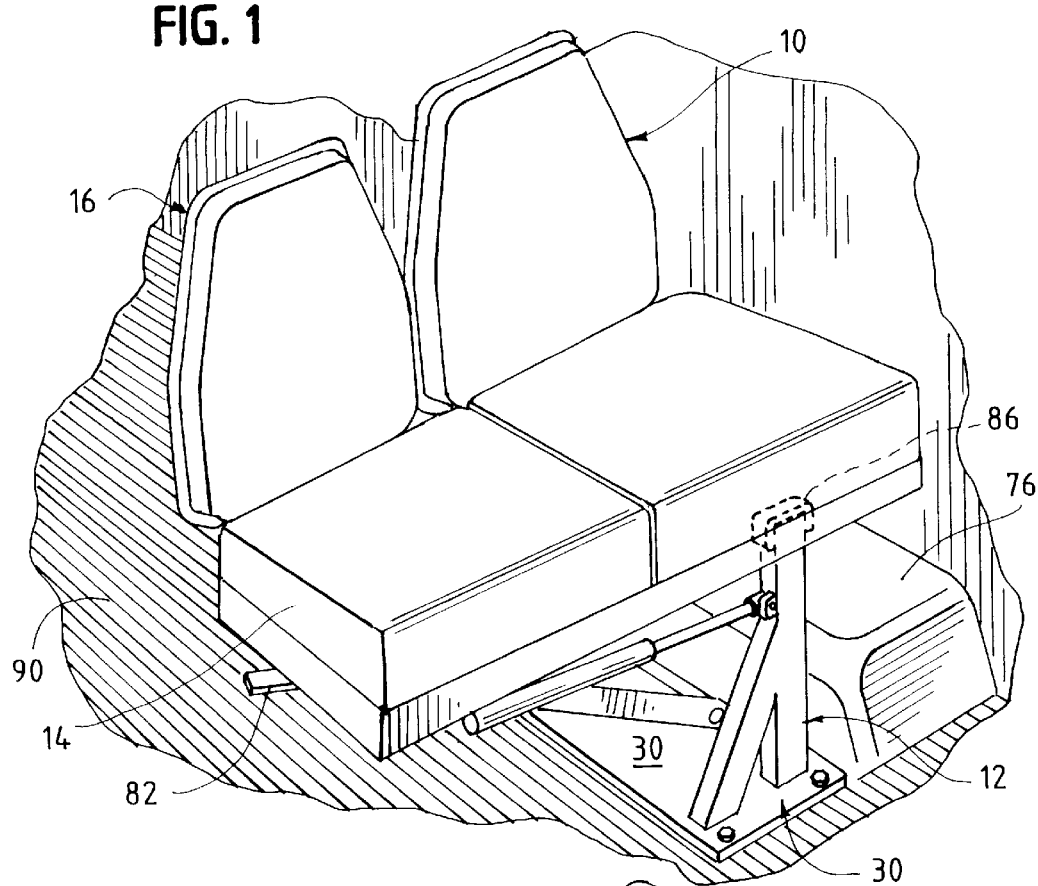
FIG. 1 is a pictorial view of the stowable seat illustrating the seatbase in a horizontally deployed position and the seatback in an unfolded position.
Figure 2:
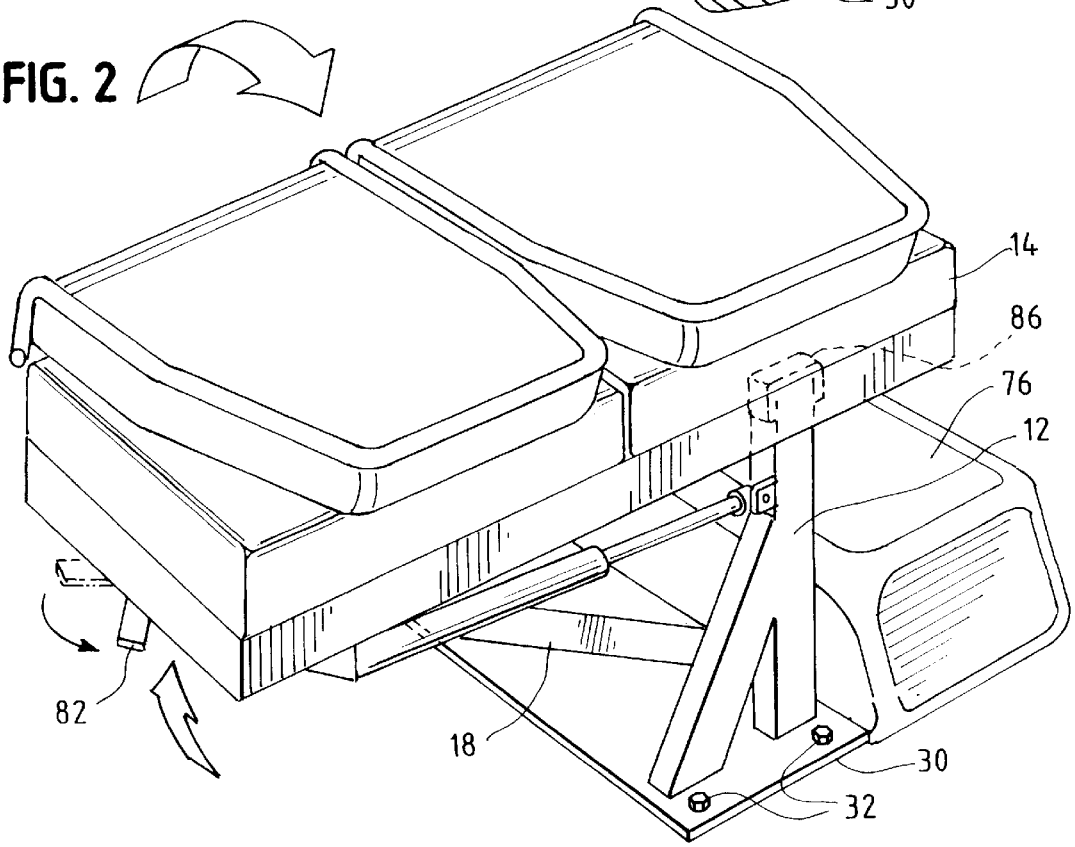
FIG. 2 is a pictorial view of the stowable seat illustrating the seatback in a folded position and the seatbase in a horizontally deployed position, and a releasable handle located on an aisle side of the seatbase for actuating movement of the seatback.

Referring to FIGS. 1 and 2 wherein like characters of reference indicate corresponding parts, the stowable seat of the invention generally is designated by the reference numeral 10. The stowable seat 10 includes a floormount or frame 12, a seatbase 14, a seatback 16 and a diagonal truss 18.

Figure 3:
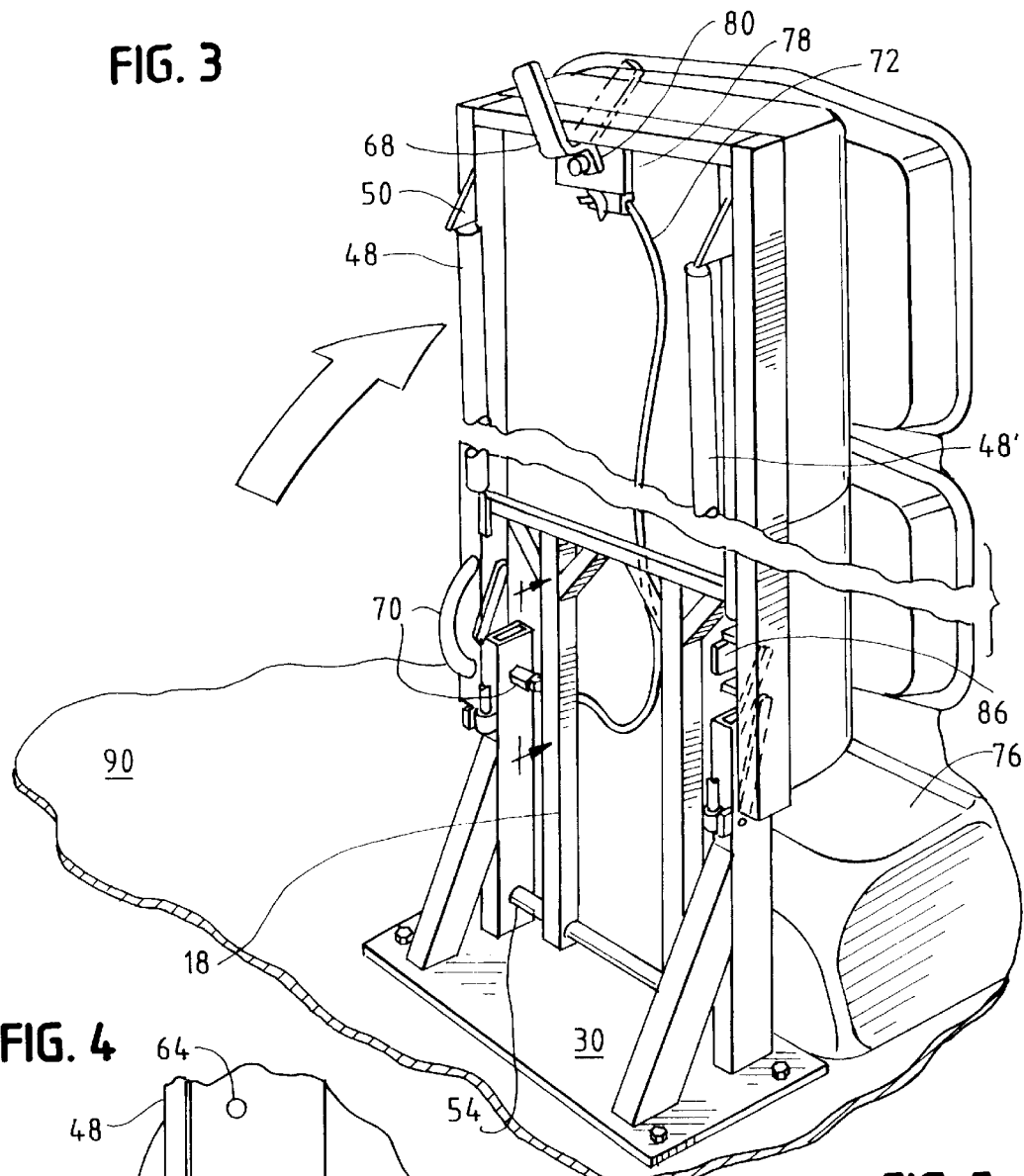
FIG. 3 is a pictorial view of the stowable seat with the seatback in a folded position and the seatbase in a substantially vertical stowed position, illustrating releasable locking mechanism means (including riding plate means with positioning holes in the seatbase and releasable pin means with pin) and a releasable handle in a locked position.
Figure 4:
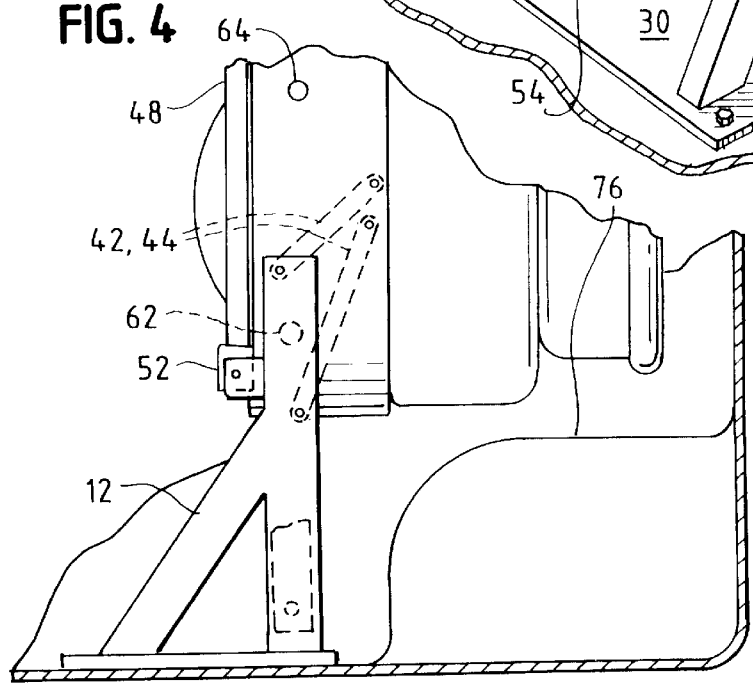
FIG. 4 is a side elevational view, in partial section, illustrating a path generating linkage system connecting the seatbase to the frame and releasable locking mechanism means which releasably locks the stowable seat in the deployed or stowed positions.
Figure 8:
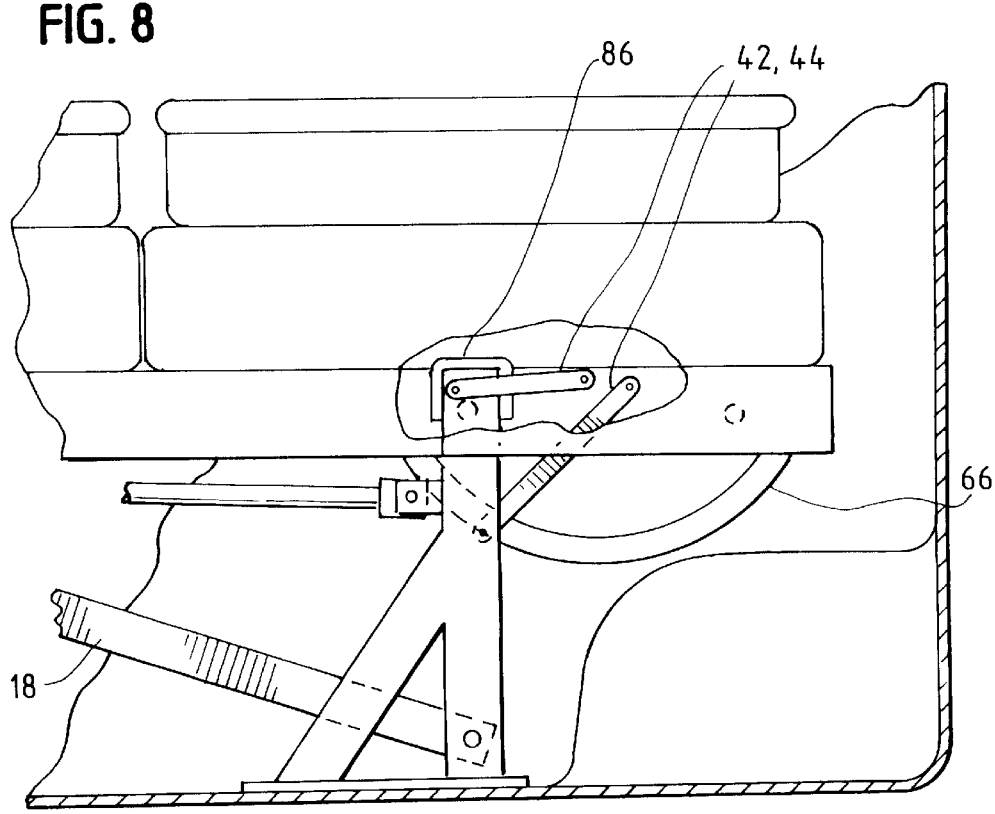
FIG. 8 is a front view, in partial section, of the stowable seat illustrating the seatback in the folded position and the seatbase in the horizontally deployed position, depicting a cap mechanism impinging on the frame.

Briefly, in operation, the stowable seat 10 is typically utilized with the seatbase 14 in a horizontal deployed position and the seatback 16 in an unfolded position as shown in FIG. 1. The seatbase 14 is supported by the diagonal truss 18. To provide a space for a wheelchair or other such article, the seatback 16 is folded over to its folded position substantially flat against the seatbase 14 as shown in FIG. 2 and the seatbase 14 is raised to its substantially vertical stowed position as FIG. 3 illustrates. The stowable seat 10 is maintained in the stowed position as shown in FIG. 3 or the deployed position as shown in FIG. 8 by employing a releasable locking mechanism means 70. The releasable locking mechanism means 70 includes riding plate means 66 with multiple positioning holes 64 in the seatbase 14 (preferably two), and releasable pin means 62 with pin 60 which is actuated by a releasable handle 68 and cable assembly 72 and slides on the surface of riding plate means 66 and into one of the positioning holes 64 in the seatbase to releasably lock the seatbase 14 into either the deployed position as shown in FIG. 1 or the stowed position as FIG. 3 illustrates.

To mount the stowable seat 10 to a floor 90 of a vehicle, the floormount or frame 12 is provided as illustrated in FIG. 1 and 3. It should be noted that the frame 12 is mounted in only one place to the floor, and not up against the wall as shown in U.S. Pat. No. 5,492,389. This single mounting provides the necessary support for the stowable seat 10 in conjunction with the diagonal support member 18, and gives improved stowability when a preexisting obstruction such as a wheel well 76 exists, providing more space for storage of an article such as a wheelchair and offering more aisle space for passengers to utilize as the stowable seat 10 can be mounted in closer proximity to the wall. It is to be understood that a skilled artisan could provide a mirror copy of the stowable seat 10 described herein for mounting to either side of the floor of the vehicle.

As FIGS. 1 and 2 illustrate, the frame 12 includes a plate 30 preferably constructed of steel. Plate 30 is provided with bolt holes 32 for bolting to the support member such as the floor 90. The remainder of the frame 12 is constructed of square tubing attached to the plate 30. To provide heel space near the support member (not illustrated), the plate 30 is offset from the center of the seatbase 14 as illustrated in FIGS. 1 and 2.

Figure 9:
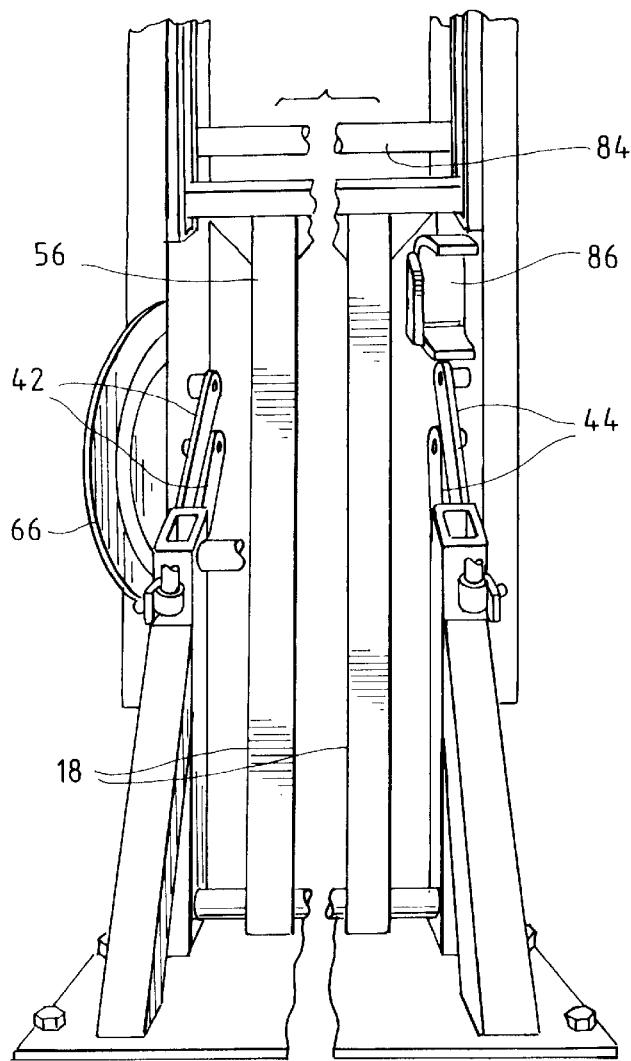
FIG. 9 is an expanded partial view of the lower portion of FIG. 3 illustrating some of the operating mechanisms located underneath the stowable seat when the seat is stowed.
Figure 11:
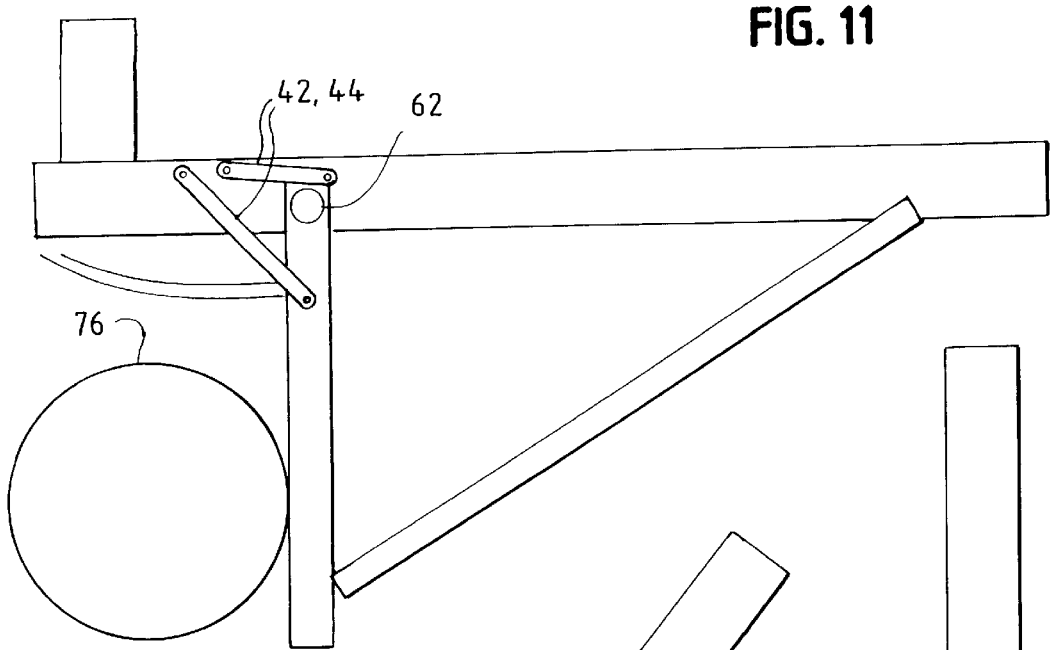
FIG. 11 is graphical view of the stowable seat in the deployed horizontal position illustrating a diagonal support truss, a path generating linkage system and an associated logarithmic path that it generates to lift and rotate the seatbase above a preexisting obstruction such as a wheel well as is shown here.
Figure 12:
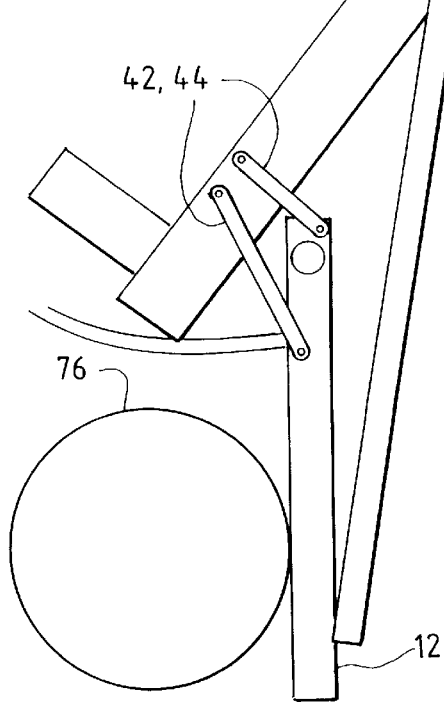
FIG. 12 is a graphical view of the stowable seat in an intermediate position illustrating a diagonal support truss, a path generating linkage system and an associated logarithmic path that it is generating to lift and rotate the seatbase above a wheel well as is shown here.
Figure 13:
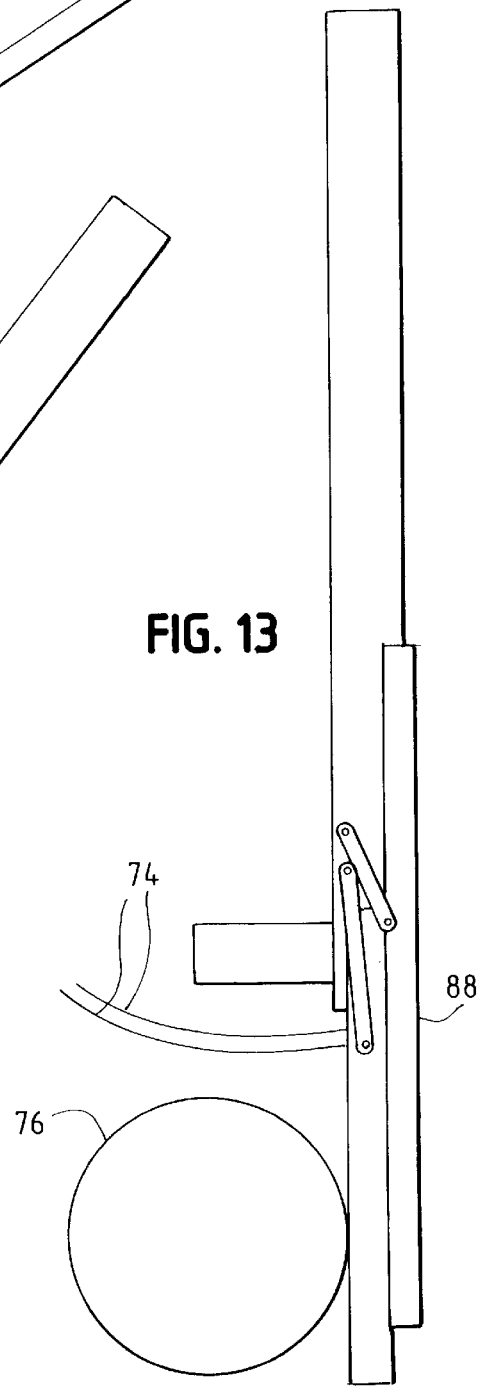
FIG. 13 is a graphical view of the stowable seat in a substantially vertical stowable position illustrating a diagonal support truss, a path generating linkage system with cutouts and an associated logarithmic path that it generated in lifting and rotating the seatbase above a wheel well as is shown here.

To provide the seatbase 14 with the range of motion extending from a horizontal deployed position as shown in FIG. 1 and FIG. 11 to the substantially vertical stowed position as FIG. 3 and FIG. 13 illustrate, the seatbase 14 is linked to the frame 12 by a path generating linkage system (preferably by two links on each side 42, 44) as FIG. 9, FIG. 11 and FIG. 13 illustrate. The links 42, 44 are positioned in parallel on opposite sides of the inner seatbase 14 moving in unison and defining a common path generated arc motion 74 as shown in FIG. 13 to clear a preexisting obstruction such as a wheel well 76. The links 42,44 work to provide a lifting and rotating motion in combination with the diagonal support truss 18 which acts to constrain the lateral and vertical movement of the seatbase 14. Cutouts 88 in the sides of the links 42,44 can be made to provide clearance for the pin 60 to actuate into a positioning hole 64 in the seatbase when the stowable seat 10 has been rotated into the substantially vertical stowed position as FIG. 13 illustrates.

To assist in raising the seatbase 14 to the stowed position as shown in FIG. 3, a gas charged cylinder 48 is attached thereto to provide a lifting force. It may be desirable to provide an additional gas charged cylinder 48' to provide an evenly distributed lifting force as FIG. 3 illustrates.

Figure 6:
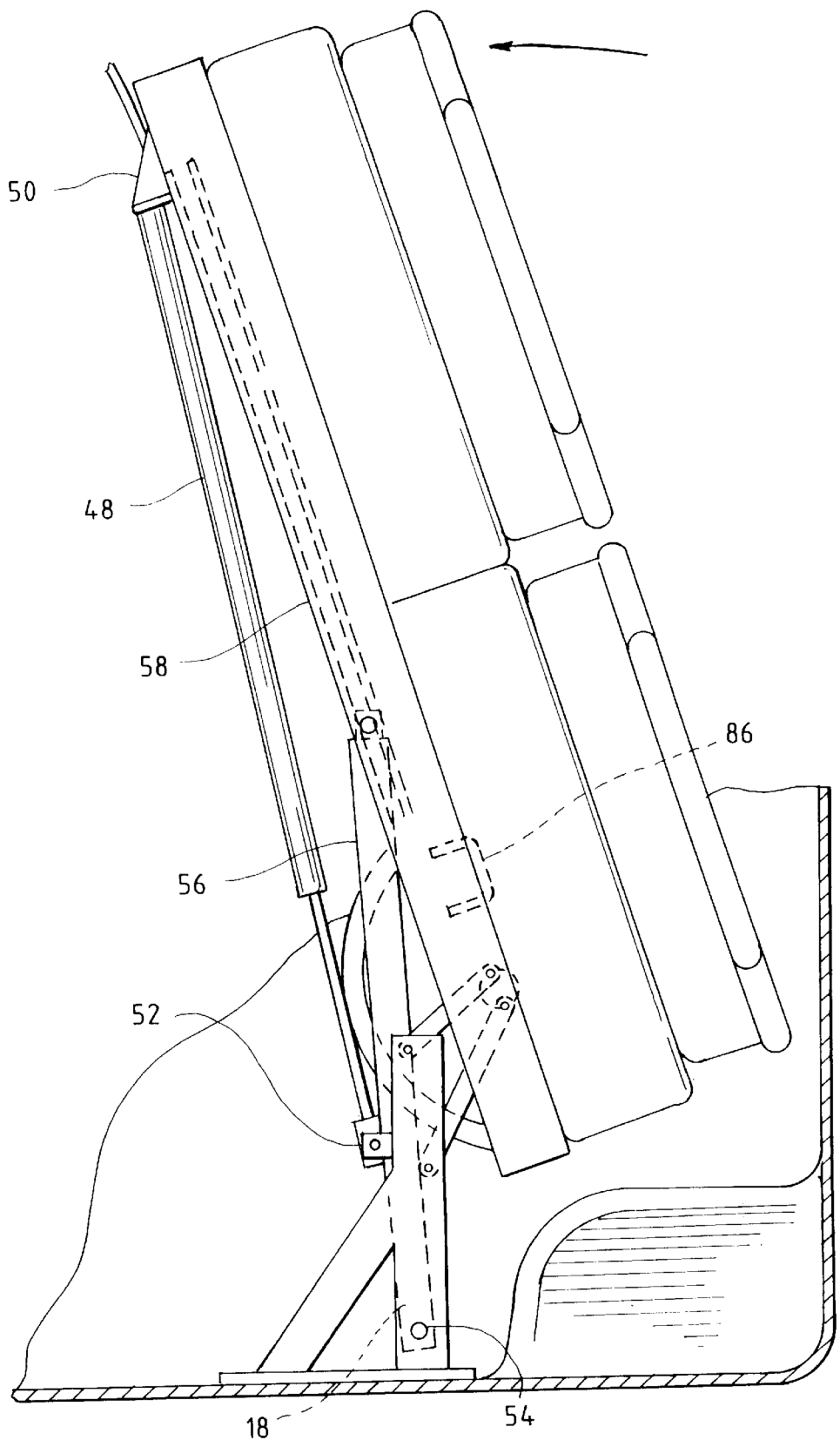
FIG. 6 is a front view of the stowable seat illustrating the seatback in a folded position and the seatbase in an intermediate position with a runner track, and a gas charged cylinder journalled to the seatbase and a diagonal truss prior to being moved to the deployed position in FIG. 8.
Figure 7:
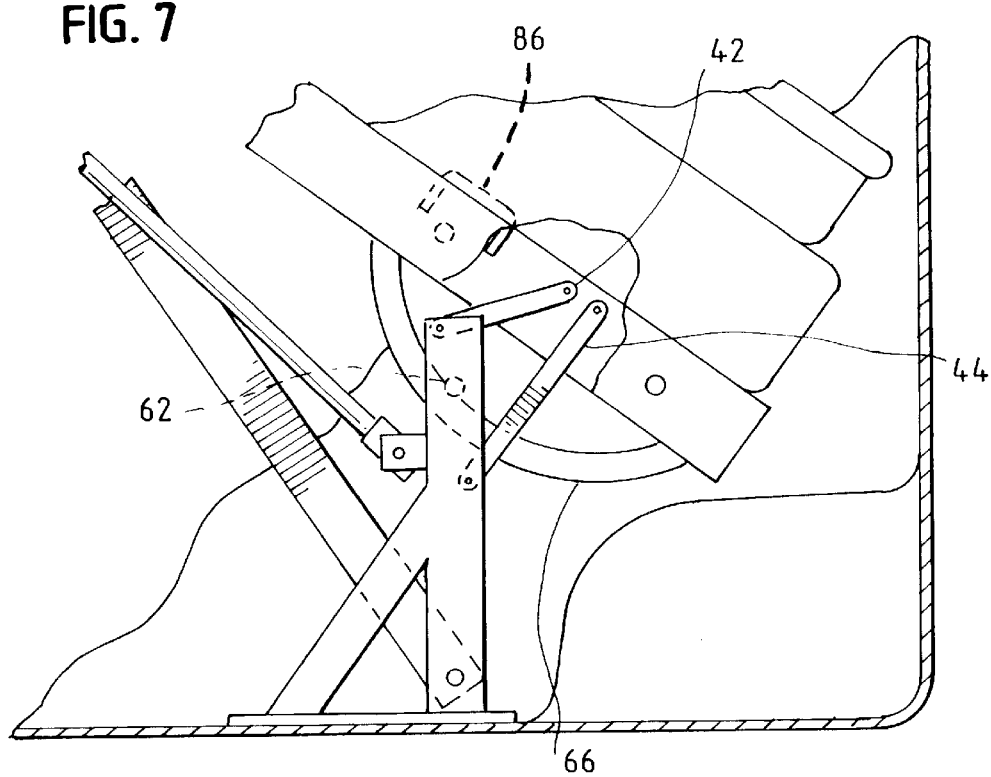
FIG. 7 is a front view, partially cut away, of the stowable seat illustrating the seatback in the folded position and the seatbase in an intermediate deployed position, depicting the path generating linkage system attached between the seatbase and the frame and releasable locking mechanism means.

To permit the gas charged cylinder 48 to rotate upward in conjunction with the seatbase 14, the gas charged cylinder 48 is rotatably journaled to a side 50 of the inner seatbase 14 as illustrated generally in FIGS. 1 and 2 and more particularly in FIGS. 3 and 6. The gas charged cylinder 48 is also rotatably journaled to a pivot point 52 on the frame 12 as FIG. 6 illustrates.

To support the seatbase 14 in its horizontal deployed position as shown in FIG. 1, the diagonal truss 18 is provided between the frame 12 and the seatbase 14. The diagonal truss 18 may be rectangular as illustrated in FIGS. 3, 9 and 10 to evenly support the seatbase 14 when deployed or may be provided as an elongate rod as generally illustrated in FIG. 8, so long as the seatbase 14 is supported in its horizontally deployed position as illustrated in FIG. 1.

The diagonal truss 18 is rotatably journaled to the frame 12 at a pivot point 54. To provide the opposite end 56 of the diagonal truss 18 with translational and rotational motion, the opposite end 56 of the diagonal truss 18 is slidably mounted within a runner track 58. It is to be understood that a second runner track 58' may be provided depending on the construction of the diagonal truss 18.

Figure 10:
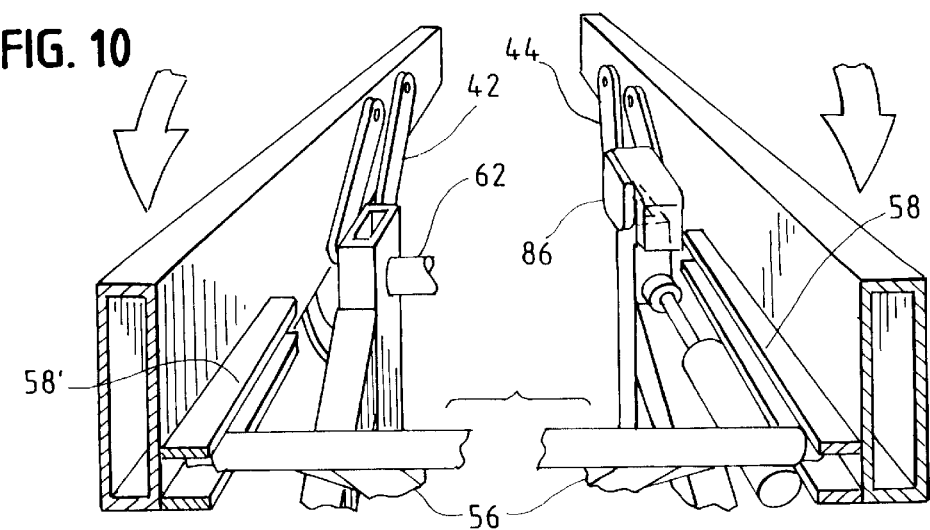
FIG. 10 is a side cut-a-way view of FIG. 9 in the horizontally deployed position illustrating the runner track mounted within the seatbase and the diagonal truss and slide member which travels within the runner track; the path generating linkage system, the cap mechanism and releasable locking mechanism means.

As viewed in FIG. 6 and FIG. 10 the runner track 58 is mounted within the seatbase 14. The diagonal truss 18 includes a slide member 84 which travels within the runner track 58 to provide translational motion to the diagonal truss 18 and also is configured to permit the diagonal truss 18 to rotate with respect to the runner track 58 as the seatbase 14 is raised.

To maintain the stowable seat 10 in the horizontally deployed position as illustrated in FIG. 1, releasable locking mechanism means 70 preferably shown as riding plate 66 and releasable pin means 62 with pin 60, is provided to lock the seatbase 14 by means of the positioning holes 64 in the seatbase 14.

To maintain the stowable seat 10 in the substantially vertical stowed position as illustrated in FIG. 3, releasable locking mechanism means 70 preferably shown as riding plate means 66 with multiple positioning holes 64 in the seatbase 14, and releasable pin means 62 with pin 60, is provided to lock the seatbase 14 with respect to the frame 12. To release the pin 60 and permit the stowable seat 10 to be lowered from its stowed position as shown in FIG. 3, the releasable pin means 62 is provided with a spring-biased releasable handle 68 which may be actuated by an operator to release the pin 60 from a positioning hole 64 in the seatbase 14.

To permit the seatbase 14 to lift and rotate with respect to the frame 12, the seatbase 14 may be joined by a path generating linkage system 42, 44 to the frame 12. To lock the seatbase 14 into the horizontal deployed position as shown in FIG. 1, releasable locking mechanism means 70 includes riding plate means 66 which provides a sliding surface on which pin 60 rides. The seatbase 14 may have multiple or preferably 2 positions which the pin 60 releasably locks into position after sliding on the surface of riding plate means 66, thereby preventing further rotation of the seatbase 14 with respect to the frame 12.

To permit further rotation of the seatbase 14 with respect to the frame 12, the pin 60 must be released from one of the positioning holes 64 of the seatbase 14. To actuate and release the pin 60 from one of the positioning holes 64, a releasable handle 68 is attached to the seatbase side plate 78 by a pivot pin 80 and actuates the pin 60 through a cable assembly 72.

In operation, stowable seat 10 is typically maintained in the deployed position as illustrated in FIG. 1. Seatbase 14 is supported by the diagonal truss 18 which has the slide member 60 constrained within the runner track 58 as FIG. 6 and FIG. 10 illustrate. With the seatback 16 in the unfolded position as shown in FIG. 1, the stowable seat 10 provides seating on a vehicle such as a bus or the like.

It may be desirable, however, to provide space for an individual in a wheel chair or for storing articles onboard where there is a preexisting obstruction such as a wheel well 76. To raise the stowable seat 10 to its stowed position as in FIG. 3, seatback 16 is folded into the folded position as shown in FIG. 2. Releasable handle 82 illustrated in FIG. 2 is actuated to release the seatback 16 and permit movement into the folded position. The releasable handle 82 is returned from the release position as shown in FIG. 2 to the locked position as shown in FIG. 1 to lock the seatback 16 into the folded position as FIG. 2 illustrates.

Figure 5:
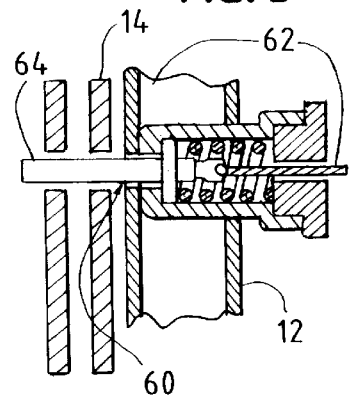
FIG. 5 is a transverse sectional view of releasable pin means of FIG. 3, taken along line 5—5 of FIG. 3.

To raise the seatbase 14 from its horizontally deployed position as shown in FIG. 1 to the substantially vertical stowed position as FIG. 3 illustrates, the releasable handle 68 of the releasable pin means 62 illustrated in FIG. 5 is actuated to release the pin 60 from a positioning hole 64 in the seatbase 14 and permit movement of the seatbase 14. Stowable seat 10 is raised into the substantially vertical stowed position as illustrated in FIG. 3 whereby the releasable handle 68 is released and the pin 60 sliding along the surface of riding plate means 66 falls into a positioning hole 64 in the seatbase thereby locking the seatbase 14 into place with respect to the frame 12. The gas charged cylinder 48 assists the operator in raising the stowable seat 10.

To prevent the stowable seat 10 from falling from its stowed position as shown in FIG. 3, releasable pin means 62 locks the seatbase 14 to the frame 12 as illustrated in FIG. 3. To return the stowable seat 10 from the stowed position as shown in FIG. 3, the releasable handle 68 actuates releasable pin means 62 thereby releasing the pin 60 and permitting the seatbase 14 to return to the horizontally deployed position as shown in FIG. 8. As the seatbase 14 returns to the horizontal deployed position, it is locked into place with respect to the frame as the pin 60 sliding along the surface of riding plate means 66 falls into a positioning hole 64 in the seatbase impinging cap 86 attached to the seat so that when the seatbase returns to the horizontal deployed position, the impinging cap is positioned to receive the top of frame 12 on one side thereof in releasably locked position so that further support is provided to the seat in its horizontal deployed position as shown in FIGS. 1 and 2. To return the seatback 16 from the folded position as shown in FIG. 2 to the unfolded position as shown in FIG. 1, the releasable handle 82 illustrated in FIGS. 1 and 2 is actuated to the release position and the seatback 16 is unfolded as FIG. 1 illustrates.

It may thus be seen that the objects of the present inventions set forth herein as well as those made apparent from the foregoing description, are officially obtained. While preferred embodiments of the invention have been set forth for purposes of disclosure, modification of disclosed embodiments of the invention as well as other embodiments thereof may occur to those skilled in the art. Accordingly, the appended claims are intended to cover all embodiments which do not depart from the spirit and scope of the invention.

What we claim is:

1. A stowable seat that can be used with a vehicle having a floor and walls, having a seatbase with a free end and a linked end that is pivotally mounted and is cantilevered and rotatable from a horizontally deployed position to a substantially vertical stowed position, the seat comprising: a frame pivotally associated with the linked end of the seatbase, said frame mountable to the floor to support the seat in both the stowed position and deployed position without need of being secured by the walls of the vehicle, whereby the linked end of the seatbase can rotate downward without being impeded by any other support means for the seat, wherein the stowable seat has a releasable locking mechanism means to support the seat in each of the positions, said releasable locking mechanism means including releasable pin means with a pin and riding plate means with multiple positioning holes in the seatbase that cooperate with said releasable pin, means to anchor the seat by forcing said pin into said positioning holes in the seat base at either the deployed position of the seatbase or the stowed position of the seatbase, whereby the stowable seat can be rotated from a substantially vertical stowed position to a horizontal deployed position and automatically locked when said pin registers with said positioning holes in the seatbase of said riding plate means.

2. The stowable seat as defined in claim 1, wherein said frame is mounted to the floor of a vehicle right-next to a preexisting obstruction.

3. The stowable seat as defined in claim 1, wherein said links of path generating linkage system have cutouts.

4. A stowable seat as defined in claim 1, further including a seatback which is rotatably associated with the seatbase, being unfolded to provide seating when the seatbase is in the horizontal deployed position and folded substantially flat against the seatbase before moving the seatbase into the substantially vertical stowed position.

5. The stowable seat as defined in claim 1, wherein said releasable pin means is spring biased.

6. A stowable seat as defined in claim 1, further comprising an impinging cap that releasably fits with said frame by having a top that releasably locks with said impinging cap when the stowable seat is in its horizontal deployed position.

7. The stowable seat as defined in claim 1, wherein said seat base has two positioning holes to anchor the stowable seat.

8. A stowable seat as defined in claim 1, further defined by an actuating means to release the seat from the horizontally deployed position to a substantially vertical stowed position as well as from a substantially vertical stowed position to a horizontal deployed position.

9. A stowable seat as defined in claim 1, wherein said selected range of motion is a logarithmic path.

10. A stowable seat as defined in, claim 1, being further defined by biasing means attached between the seat base and said frame for providing a lifting force to assist in positioning and maintaining the stowable seat in the stowed position.

11. The stowable seat as defined in, claim 10, wherein said biasing means is defined as a pressurized cylinder.

12. A stowable seat as defined in claim 1, further including a path generating linkage system for insuring stowability and stability of the stowable seat, said path generating linkage system being mounted thereto and including multiple links for associating the seatbase with said frame in a path generated arc to provide a selectable range of motion to avoid obstructions when the stowable seat is moved between the horizontal deployed position and the substantially vertical stowed position.

13. The stowable seat as defined in claim 12, wherein said path generated linkage system has four links.

14. The stowable seat as defined in claim 1, wherein said frame includes first and second sides.

15. In a stowable seat as defined in claim 14, releasable cap means extending from a seat and impinging with the top of the frame on at least one of said frames first or second sides to further lock said seat in its horizontal deployed position.

* * * * *